(12) United States Patent
Liao et al.

(10) Patent No.: US 10,739,230 B2
(45) Date of Patent: Aug. 11, 2020

(54) SYSTEM AND METHOD FOR DETECTING ANOMALY OF A MACHINE TOOL

(71) Applicant: Palo Alto Research Center Incorporated, Palo Alto, CA (US)

(72) Inventors: Linxia Liao, Mountain View, CA (US); Rajinderjeet Singh Minhas, Mountain View, CA (US); Arvind Rangarajan, Santa Clara, CA (US); Tolga Kurtoglu, San Jose, CA (US); Johan de Kleer, Los Altos, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 74 days.

(21) Appl. No.: 16/200,014

(22) Filed: Nov. 26, 2018

(65) Prior Publication Data
US 2019/0094108 A1   Mar. 28, 2019

Related U.S. Application Data (62) Division of application No. 14/499,060, filed on Sep. 26, 2014, now Pat. No. 10,139,311.

(51) Int. Cl.
*G01M 13/00*   (2019.01)
*G05B 19/4065*   (2006.01)
*B23Q 17/09*   (2006.01)
*G05B 23/02*   (2006.01)

(52) U.S. Cl.
CPC ......... *G01M 13/00* (2013.01); *B23Q 17/0995* (2013.01); *G05B 19/4065* (2013.01);
(Continued)

(58) Field of Classification Search
CPC . G01M 13/00; B23Q 17/0995; G05B 9/4065; G05B 23/0283;
(Continued)

(56) References Cited

U.S. PATENT DOCUMENTS 8,781,982 B1   7/2014   Das et al.
2010/0082267 A1   4/2010   Schimert et al.

OTHER PUBLICATIONS

Chen, C., Zhang, B., Vachtsevanos, G., & Orchard, M. (2011). Machine condition prediction based on adaptive neuro-fuzzy and high-order particle filtering. Industrial Electronics, IEEE Transactions on, 58(9), 4353-4364.

(Continued)

*Primary Examiner* — Manuel L Barbee
(74) *Attorney, Agent, or Firm* — Patrick J. S. Inouye; Leonid Kisselev (57) ABSTRACT

A self-aware machine platform is implemented through analyzing operational data of machining tools to achieve machine tool damage assessment, prediction and planning in manufacturing shop floor. Machining processes are first identified by matching similar processes through an ICP algorithm. Machining processes are further clustered by Hotelling's T-squared statistics. Degradation of the machining tool is detected through a trend of the operational data within a cluster of machining processes by a monotonicity test, and the remaining useful life of the machining tool is predicted through a particle filter by extrapolating the trend under a first-order Markov process. In addition, process anomalies across machines are detected through a combination of outlier detection methods including SOMs, multivariate regression, and robust Mahalanobis distance. Warnings and recommendations are flexibly provided to manufacturing shop floor based on policy choice.

20 Claims, 9 Drawing Sheets

(52) U.S. Cl.
CPC ............ *G05B 23/0283* (2013.01); *G05B 2219/34477* (2013.01); *G05B 2219/37252* (2013.01); *G05B 2219/37258* (2013.01); *G05B 2219/50185* (2013.01)

(58) Field of Classification Search
CPC ........... G05B 2219/34477; G05B 2219/37252; G05B 2219/37258; G05B 2219/50185
See application file for complete search history.

(56) References Cited

OTHER PUBLICATIONS

Coble, J., & Hines, J.W. (2009). Identifying optimal prognostic parameters from data: a genetic algorithms approach. In Annual conference of the prognostics and health management society, san diego, ca, Sep. 2009.

Filzmoser, P., Garrett, R. G., & Reimann, C. (Jun. 2005). Multivariate outlier detection in exploration geochemistry. Computers & Geosciences, 31(5), 579-587. doi: 10.1016/j.cageo.2004.11.013.

Filzmoser, P., Maronna, R., & Werner, M. (2008). Outlier identification in high dimensions. Computational Statistics & Data Analysis, 52(3), 1694-1711.

Standard, M. (2009). Part 1-overview and protocol, version 1.01. MTConnect Institute.

Liao, L., & Pavel, R. (2012). Machine tool feed axis health monitoring using plug-and-prognose technology. In Proceedings of the 2012 conference of the society for machinery failure prevention technology.

Meinshausen, N. (2006). Quantile regression forests. Journal of Machine Learning Research, 7,983-999.

Rougier, N., Boniface, Y., & Universit, L. (2011). Dynamic selforganising map. Neurocomputing, 11(74), 1840-1847.

Savoye, Y. (2012). Iterative cage-based registration for dynamic shape capture. In Acm siggraph 2012 posters (p. 94).

SYSTEM AND METHOD FOR DETECTING ANOMALY OF A MACHINE TOOL

CROSS-REFERENCE TO RELATED APPLICATION

This non-provisional patent application is a divisional of U.S. patent application Ser. No. 14/499,060, filed Sep. 26, 2014, pending, the priority date of which is claimed and disclosure of which is incorporated by reference.

FIELD

This application relates in general to detecting machine tool wear, predicting machine tool remaining useful life, and providing recommendation on machine maintenance and replacement, and in particular, to a system and method for detecting an anomaly of a machine tool.

BACKGROUND

The machining of a workpiece made from raw stock or material, such as metal, is a form of subtractive manufacturing during which parts of the workpiece is progressively removed until the workpiece reaches an intended shape and size. Operations during machining primarily involve turning, drilling and milling the raw material into a desired part, which respectively require removing the raw material by rotating the raw material against a stationary cutting tool, axially boring holes using a rotating bit with a cutting edge on a distal end whilst the workpiece is held stationary, and cutting away the raw material using a rotating bit with cutting edges generally along the rotating bit's sides and distal end.

Machine tools, or tools, is the parts of machines that came into contact with the workpiece, and achieves turning, cutting, drilling, sanding, knurling, facing, deformation, or other operations. Examples of machine tools includes a drill bit or a milling cutters.

Drilling is a cutting process that uses a drill bit to cut or enlarge a hole of circular cross-section in solid materials. The drill bit is a rotary cutting tool, often multipoint. The bit is pressed against the workpiece and rotated at rates from hundreds to thousands of revolutions per minute (RPM). This forces the cutting edge against the workpiece, cutting off chips from the hole as the workpiece is drilled.

Milling is a cutting process that uses a milling cutter to remove material from the surface of a workpiece. The milling cutter is a rotary cutting tool, often with multiple cutting points. As opposed to drilling, where the tool is advanced along the tool's rotation axis, the cutter in milling is usually moved perpendicular to the rotation axis so that cutting occurs on the circumference of the cutter. As the milling cutter enters the workpiece, the cutting edges of the tool repeatedly cut into and exit from the material, shaving off chips from the workpiece with each pass.

Both drilling and milling involve traversing a rotating bit along a longitudinal axis in the Z-direction. Milling, which operates in three-dimensional space, also involves moving the rotating bit along a plane in X- and Y-directions. The position of a machine tool at a time can be accurately described in the 3-dimensional space. The path a machine tool traversed while processing a workpiece is referred as the tool path, and can be defined by tracking locations on X-, Y-, and Z-axes in a time window. The speed at which the workpiece advances through the cutter is called feed rate, or just feed; which is most often measured in length of workpiece per full revolution of the rotating bit.

Furthermore, there can be more than three axes to define a tool path in certain machines. In a machining process, tools may move in four or more ways to manufacture parts out of metal or other materials by milling away excess material, by water jet cutting or by laser cutting. While a typical computer numerically controlled tools support translation in three axes, multi-axis machines also support rotation around one or more axes. For example, a 5-axis machines may perform a machining process using the linear X-, Y-, and Z-axes and two rotary axes. Typically, there are two types of 5-axis processing. The first is a 3-axis processing with 2-axis indexing, which involves normal linear 3-axis processing after indexing the inclined planes by using the two rotary axes. The second is processing with the two rotary axes while moving with three linear axes.

In machine tools, a spindle is a rotating axis of the machine, which often has a shaft at the center of the axis. The shaft itself is called a spindle; but also, in shop-floor practice, the word often is used metonymically to refer to the entire rotary unit, including not only the shaft itself, but its bearings and anything attached to the shaft. A machine tool may have one or several spindles, such as the headstock and tailstock spindles on a bench lathe. The main spindle is usually the biggest one. References to "the spindle" without further qualification imply the main spindle. Spindles are powered, and impart motion to the machine tools or the workpiece. The spindle speed is the rotational frequency of the spindle of the machine, measured in RPM. The spindle power is the power set to be used by the spindle. The spindle load is the power drawn from the spindle motor. Both the positions on X-, Y-, and Z-axes and spindle speed, spindle power, and spindle load are parameters useful in defining or describing the state and history of the machine tool usage.

A critical factor in securing a successful output of a machining process is the ability of a machine tool to maintain the machine tool's accuracy and repeatability. Changes due to wear or failure of a machine tool can lead to significant losses in production and unexpected downtime. How to detect machine tool wear and tear and to predict a right time for tool maintenance or replacement are a persistent challenge for almost all manufacturing shops.

Monitoring systems are being developed to track operation conditions of machine tools; however, the data collected from sensors are not well correlated with the in-process machining operating conditions, which compromises the prediction accuracy. As a result, the prevailing method of manufacturing shop floor scheduling still relies on a generalized algorithm of time to failure (e.g. exponential fault growth). The method lacks accuracy because the algorithm depends upon typical assumptions rarely applicable in a real machining process. Thus a manufacturing shop without a reliable prediction tool always faces the dilemma of either being over-cautious by unnecessarily disrupting workflow when the tools are still functioning well, or encountering a catastrophic loss for failing to replace a worn tool.

Numerical control (NC) is the automation of machine tools that are operated by precisely programmed commands encoded on a storage medium, as opposed to controlled manually via hand wheels or levers, or mechanically automated via cams alone. Most NC today is computer numerical control (CNC), in which computers play an integral part of the control. The development and proliferation of CNC imposes a higher demand for reliability of machine tools. With the advancement of sensing technology and automation, more information can be collected. However, independently operated machine systems and proprietary interfaces and machine communication protocols can lead to excessive time and cost to utilize the data.

In an effort to facilitate the organized retrieval of process information from numerically controlled machine tools, MTConnect project was initiated. MTConnect is a manufacturing industry standard designed for the exchange of data between shop floor equipment and software applications used for monitoring and data analysis. However, the primary applications developed using MTConnect data are focused on the visualization and reporting of Overall Equipment Effectiveness (OEE) and history of alarms. No insight for assessing and predicting machine tool wear and failure has been reported.

Thus there remains a need for creating a self-aware machine platform in manufacturing shop floor, including detecting machine tool degradation, predict future failure of the machine tool, and provide advice on managing a manufacture floor shop, based on the data collected on the machine tool path and other parameters.

SUMMARY

A method and a system for detecting machine tool wear or anomaly, predicting machine tool remaining useful life, and planning in manufacturing shop floor us provided. Operational data for machine tools are collected. Tool paths are registered with the aid of a modified Interactive Closest Point (ICP) algorithm, which finds the best matching between two clouds of 3-D spots. The result of ICP tool path matching, together with other parameters such as spindle speed, feed rate and tool number, are used to adaptively cluster the machining processes. For each process group, a particle filter based prognostic algorithm is used to predict tool wear or spindle bearing failure. In addition, anomalies in the background of normal behavior of the machine are detected and securitized to detect change in normal behavior or point to impending failures of the machine. Multiple machine learning, anomaly detecting algorithms are combined in the detection to make dependable predictions. In addition, the aggregated axes traverse and the spindle load verse rotating speed are incorporated to provide a measure of the wear on various axes in the machine. Warnings or advices are sent to managers, supervisors, or automatic machine circuit breaks to facilitate manufacturing shop floor planning.

In one embodiment, a method and system for detecting anomaly of a machine is provided. A stream of operational data is collected. The distribution patterns of the operational data are characterized by multiple analytical methods. New operational data is compared to the distribution patterns of the multiple analytical methods. The presence of one or more outliers against the distribution patterns of the analytical methods are determined. The number of the outliers are compared to a pre-determined threshold. Notice is sent when the number exceeds the threshold, wherein maintenance of the machine tool is performed based on the notification. The analytical methods include self-organizing maps (SOMs), multivariate regression, and robust Mahalanobis distance, respectively.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Machine Tool Degradation Monitoring and Prediction

Figure 1:
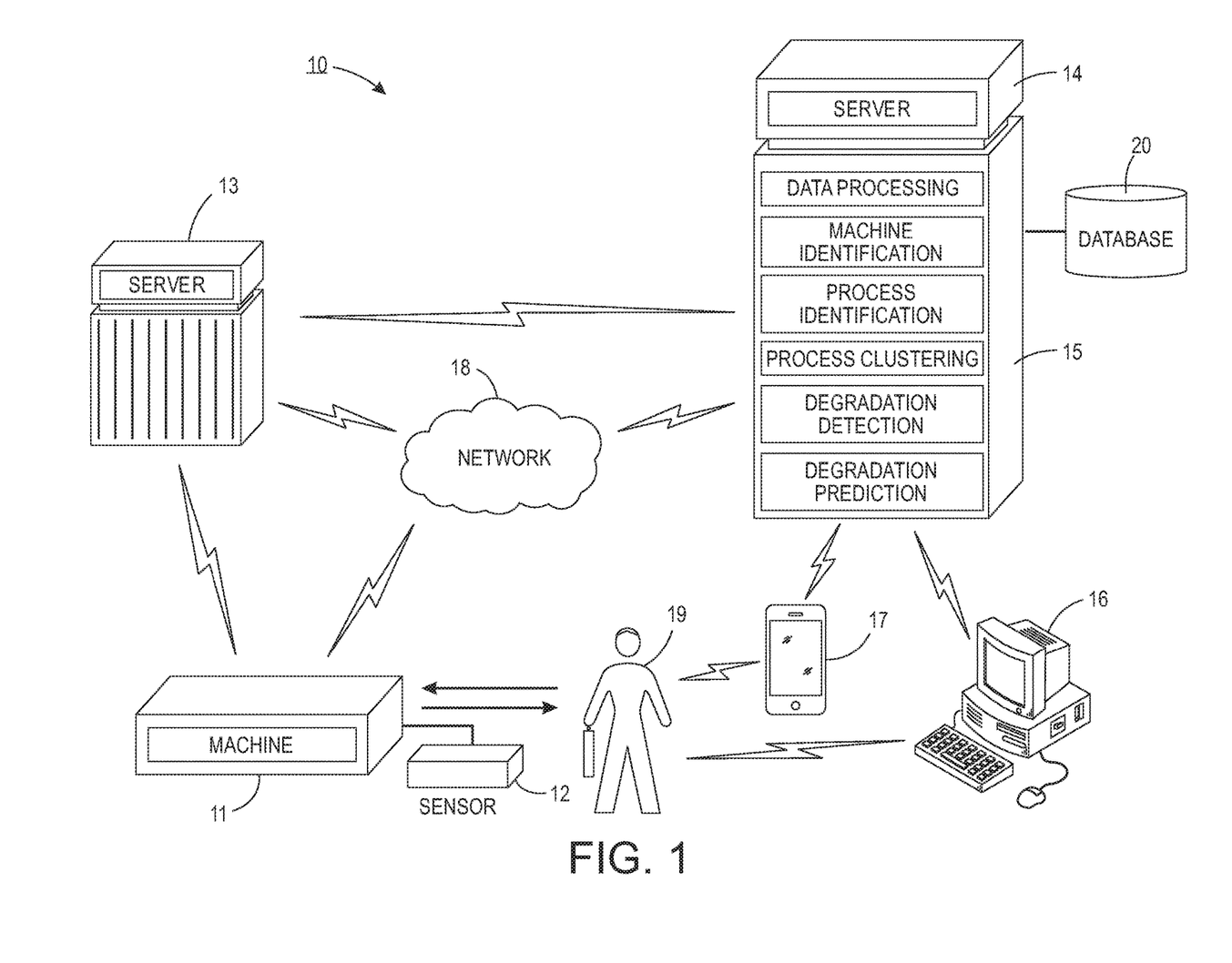
FIG. 1 is a functional block diagram showing a computer-implemented system for detecting degradation and predicting failure of a machine tool in accordance with one embodiment.

A self-aware system capable of integrating multiple sources of information, detecting machine tool wear, and predicting failure is utilized to provide advice on manufacturing shop floor. The system includes components that processes operational data, automatically identify machine and machining processes, clusters the machining processes, detects machine tool degradation, and predicts machine tool remaining useful life. FIG. 1 is a functional block diagram showing a computer-implemented system for detecting degradation and predicting failure of a machine tool in accordance with one embodiment. A Web-based server (13) collects operational data of a machine (11) gathered through a sensor (12) installed on or close to the machine (11). An aggregate of programs or modules (15) are provided through a centralized server (14) that can be remotely accessed via the Web over a wide area public data communications network, such as the Internet, using wired or wireless connections. Alternatively, these programs or modules can be installed directly on the machine (11) and connected to the machine (11) through wires (not shown). Furthermore, these programs or modules can be installed within the manufacturing shop that houses the machine (11) and connected to the machine (11) through wires or wireless means (not shown). Users (19) interface with the centralized server (14) through a Web browser (18) executing on a computer (16), hand-held device (17), or other similar devices. The central server (14) is operatively coupled to a storage device (20), within which is stored common parameters of the machine tools, and a library of machine tools, which may be specific to the manufacturing shop. Both the server (14) and computer (16) include components conventionally found in general purpose programmable computing devices, such as a central processing unit, memory, input/output ports, network interfaces, and non-volatile storage, although other components are possible. In addition, other computational components are possible. The programs or modules (15) includes an aggregates of modules that implements a sets of functions, including operational data processing, machine and tool process identification, process clustering, machine tool degradation detection, the remaining useful life prediction, outlier detection, and manufacturing shop floor planning analysis algorithms.

The server (14) can each include one or more modules for carrying out the embodiments disclosed herein. The modules (15) can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. In another instance, the modules can be, separately or in groups, installed or integrated onto the machine and direct the machine to collect operational data, register tool path, identify machining processes, cluster the processes, detect a trend within a cluster, and predicting remaining useful life of the machine tool. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
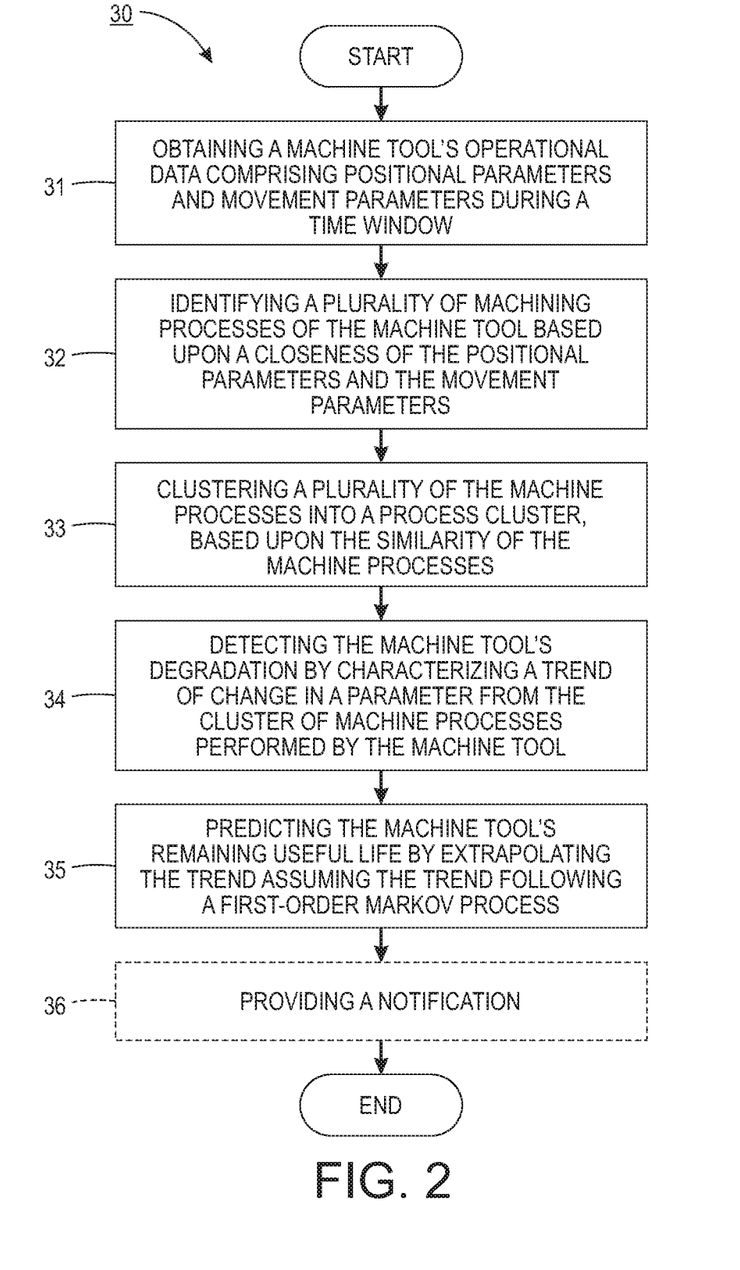
FIG. 2 is a flow diagram showing a computer-implemented method for detecting degradation and predicting failure of a machine tool in accordance with one embodiment.

A computer-implemented method is provided to provide warning or recommendation for manufacturing shop floor supervisors or operators on accumulated damage of the machine tools, by using automatic clustering of machining processes and particle filter based prognostics using time series data of the machine tools. FIG. 2 is a flow diagram showing a computer-implemented method for detecting degradation and predicting failure of a machine tool in accordance with one embodiment. Operational data, such as a time series of positional parameters and movement parameters of a machine tool, are collected and retrieved (31). The operation data are pre-processed by indexing or adding a time stamp. A machine is identified, usually by using the machine's unique IP address. A plurality of machining processes are identified, by matching one set of spatial and movement parameters with another set of spatial and movement parameters to find close matches as belonging to one process (32). The processes thus identified are further clustered into groups or clusters according to similarity of the processes (33). Tool wear or degradation is detected by characterizing a trend of change in a parameter from the cluster of machine processes performed by the machine tool (34). The remaining useful life of the machine tool is predicted by extrapolating the trend following a first-order Markov process and adapting a particle filter (35). Optionally, the results of the detection can be used for decision making on a manufacturing shop floor (36).

Data Collection and Preprocessing

The machine tool operational data includes machine tool identification parameter, positional parameters, and movement parameters. The identification parameter can be a tool number that identifies the tool. The positional parameter can be X-axis position, Y-axis position, and Z-axis position. For multi-axis machines, the positional parameter can further include the degree of rotation for the rotary axes. The movement parameter can be spindle speed, spindle speed override, feed rate, feed rate override, spindle load, X-axis load, Y-axis load, Z-axis load, and spindle power. These parameters, or variables, describe and define the machine tool's position, movement, and usage.

In one embodiment, the machine tool data may be obtained online from a public URL for the MTConnect challenge. A query post is sent periodically to the public URL. Returning data files are parsed; time stamps are applied to the values of the variables. A vector of a time stamp and the values of the variables are obtained. A matrix of data indexed by multiple time stamps is stored for analysis.

Machine and Process Identification

Machine identification can be performed to localize the machine where the tool is installed. In one embodiment, different machines can be identified using the IP addresses associated with the machines.

A machining process is defined as a process in which a machining tool performs a job on a workpiece. The machining process is characterized by a combination of positional parameters and movement parameters during the time window of the process; i.e., by a 3-dimensional (3-D) path the machine tools traversed during the process and the spindle speed and feed rate associated with each location of the tool path. When the machine tool performs a different job, the tool path or the movement parameters are likely to be different, resulting a different or new machining process. When the machine tool performs a repetitive or a closely related job, the tool path and the movement parameters are likely to be significantly similar, and the machining processes are typically significantly similar.

A machining process is defined by both the positional parameters and the movement parameters. For one identified tool, the tool path consists of multiple X-axis, Y-axis, and Z-axis positions. These X-, Y-, and Z-positions determine the shape of the tool path in 3-D space termed shape space. For the same tool and the same process, the spindle speeds and feed rates during the process further defines the process. The spindle speeds, feed rates, and their correlated times can be represented by forming a 3-D shape termed movement parameter shape, or parameter shape in short, in a 3-D space termed parameter space. Together the tool path shape in the shape space and the parameter shape in the parameter space may define the vast majority of tool processes. For multi-axis machines, addition parameters, such as the degree of rotation for a rotary axis, may be further incorporated into the shape space and parameter space.

Figure 3:
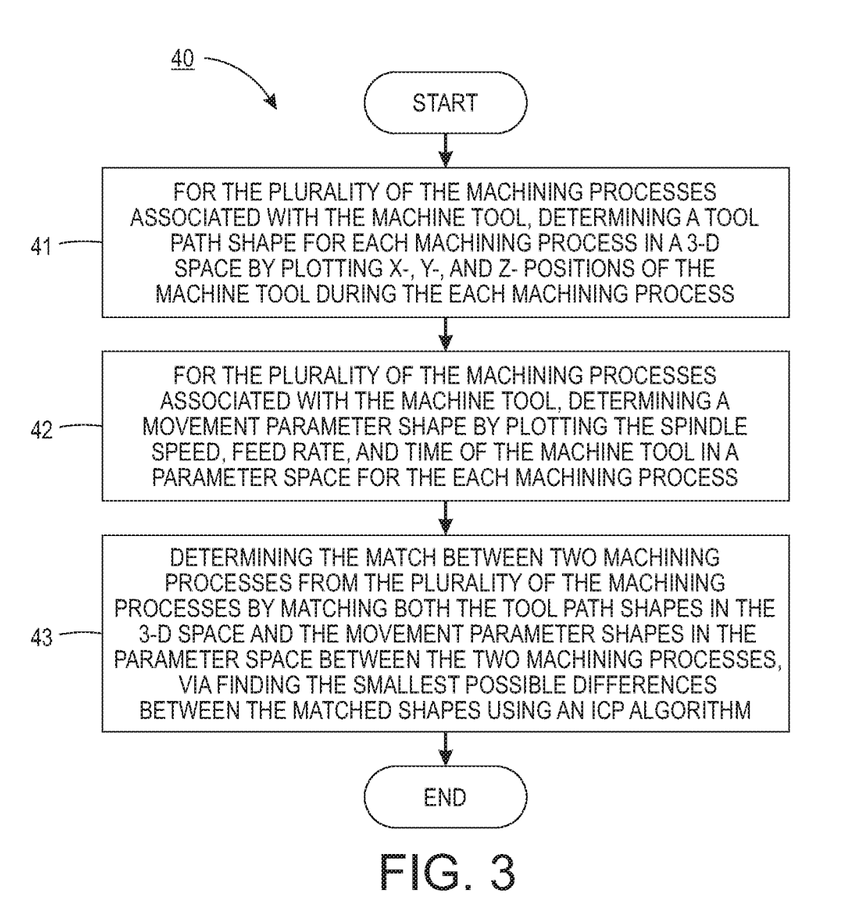
FIG. 3 is flow diagram showing a computer-implemented method for identifying a machining process based upon a match of the positional parameters and the movement parameters that defines the processes in accordance with one embodiment

In one embodiment, a machining process is identified based upon a significant similarity between both the positional parameters and the movement parameters associated with a plurality of processes using the same tool. FIG. 3 is flow diagram showing a computer-implemented method for identifying a machining process based upon a match of the positional parameters and the movement parameters that defines the processes in accordance with one embodiment. Frist, for the plurality of the machining processes associated with the machine tool, determining a tool path shape for each machining process in a 3-D space by plotting X-, Y-, and Z-positions of the machine tool during the each machining process (41). Second, for the plurality of the machining processes associated with the machine tool, determining a movement parameter shape by plotting the spindle speed, feed rate, and time of the machine tool in a parameter space for the each machining process (42). Finally, determining the match between two machining processes from the plurality of the machining processes by matching both the tool path shapes in the 3-D space and the movement parameter shapes in the parameter space between the two machining processes, via finding the smallest possible differences between the matched shapes using an Interactive Closest Point (ICP) algorithm (43).

The match between the tool path shapes is determined by matching tool path shapes using an ICP algorithm. In addition, the match between the movement parameter shapes is also determined by matching the movement parameter shapes using the ICP algorithm. In a further embodiment, the best machining was found by assigning an original cloud of 3-D space points as source, a transformed cloud of points as transform, and a targeted cloud of points as target. The operation matrix of rotation, scaling and translation are T, b and c, respectively. After the operation the following equation is obtained:

$$\text{transform} = b * \text{source} * T + c \qquad (1)$$

The ICP algorithm optimizes the operation matrix of T, b and c so that the difference (denoted as d) between transform and target is minimized. The difference shows the extent to which source and target are different. The smaller the difference, the better the match/overlap between source and target. The difference between the tool path shapes in shape spaces is denoted as $d_s$, and the difference between the movement parameter shapes in the parameter spaces is denoted as $d_p$. The matching measure is denoted as $d_a = [d_s, d_p]$ and calculated by combining $d_s$ and $d_p$.

Process Clustering

Figure 4:
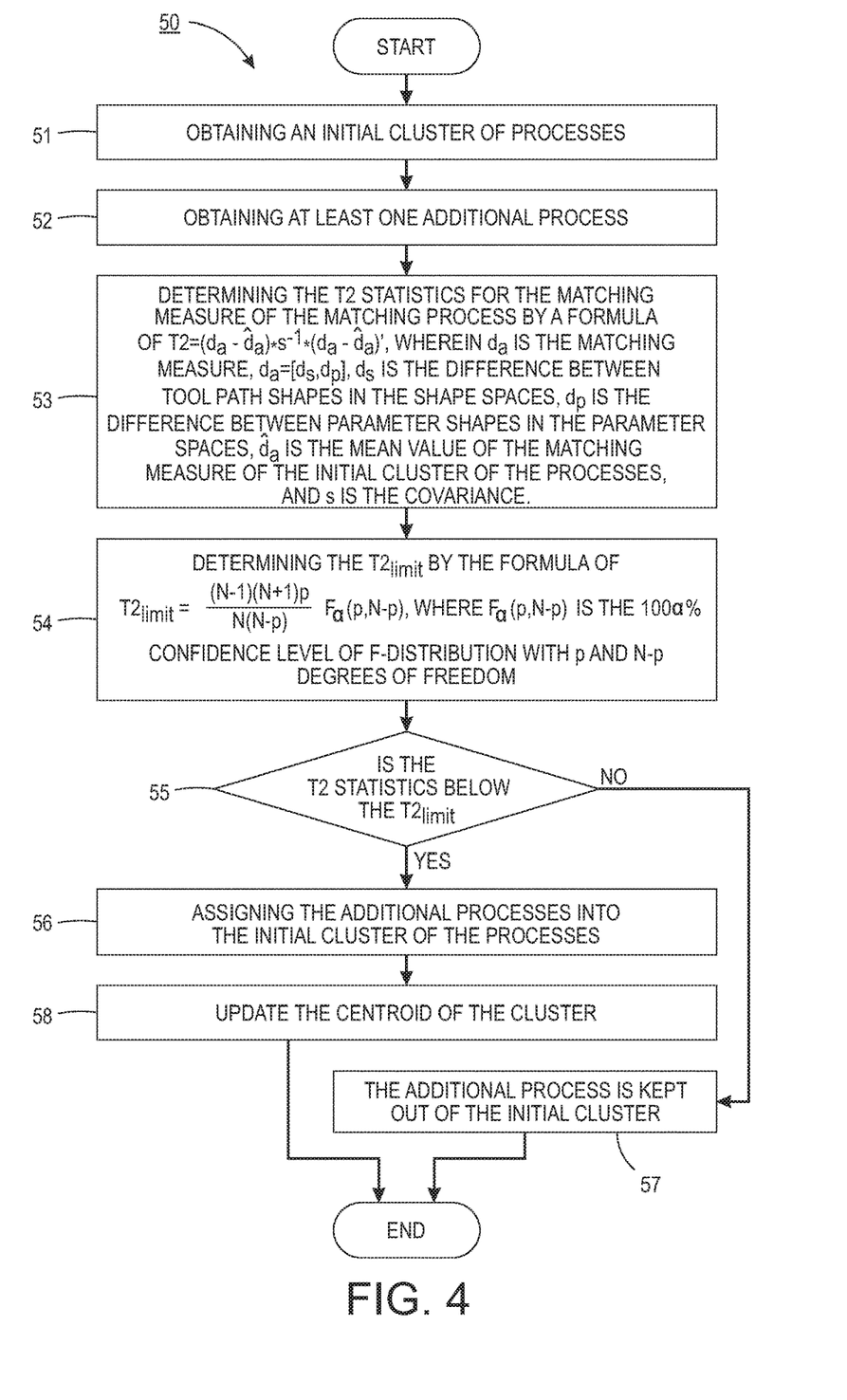
FIG. 4 is flow diagram showing a computer-implemented method to automatically cluster machining processes into clusters in accordance with one embodiment.

Process clustering refers to grouping, or clustering, similar machining processes in a group or cluster. When machines are programmed to perform different jobs, different machining processes are recorded; often, machine are programmed to perform the same or repetitive job, as a result similar machining processes are recorded. Clustering a process allows detecting a trend of the process, monitoring outliers, as described supra. FIG. 4 is flow diagram showing a computer-implemented method to automatically cluster machining processes into clusters in accordance with one embodiment. An initial cluster of the processes is obtained (51). The initial cluster of the processes can be obtained through assigning known repetitive processes into a cluster, or borrowing an existing cluster of processes from a prior record or analyses. At least one additional process is obtained (52). For each additional process, the similarity to the initial group of the processes is ascertained by determining the Hotelling's T-squared or T2 statistics for the matching measure of the additional process by a formula of $$T2 = (d_a - \hat{d}_a) * s^{-1} * (d_a - \hat{d}_a)' \qquad (2)$$

wherein $d_a$ is the matching measure, $d_a = [d_s, d_p]$, $d_s$ is the difference between tool path shapes in the shape spaces, $d_p$ is the difference between movement parameter shapes in the parameter spaces, $\hat{d}_a$ is the mean value of the matching measure of the initial cluster of the processes, and s is the covariance (53).

The T2 control limit is calculated by a formula of $$T2_{limit} = \frac{(N-1)(N+1)p}{N(N-p)} F_\alpha(p, N-p) \qquad (3)$$

where $F_\alpha$ (p, N–p) is the 100α % confidence level of F-distribution with p and N–p degrees of freedom (54).

The T2 statistics value is compared to the $T2_{limit}$ 54. If the T2 statistics is below the $T2_{limit}$, the process is assigned to the initial cluster of the processes (55). The parameters of the additional process is used to update the centroid of the initial cluster (56). If the T2 statistics is above the $T2_{limit}$, the additional process kept out of the cluster (57).

Degradation Detection

Machine tool wear, or degradation, refers to a gradual loss of structural or functional integrity of the machine tool due to usage, fatigue, wear, ageing or other causes. Degradation of a machine tool may be accompanied by a consistent trend of changes in one or more parameters in a cluster of machining processes performed by the machine tool. Detecting this trend above signal noise may enable the detection of underlying degradation of the machine.

Figure 5:
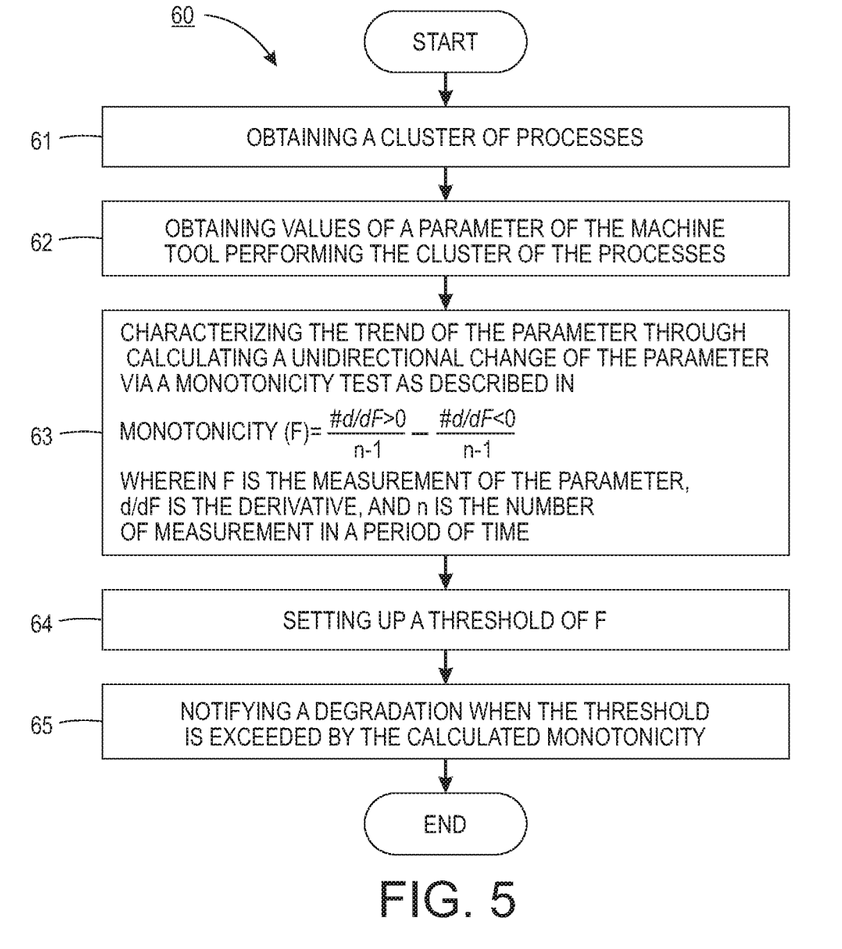
FIG. 5 is flow diagram showing a computer-implemented method to detect the machine tool's degradation by characterizing a trend of change of a parameter in the cluster of machining processes performed by the machine tool in accordance with one embodiment.

In one embodiment, the trend of the change in a parameter in a cluster of machining processes performed by the machine tool is detected by a monotonicity test. FIG. 5 is flow diagram showing a computer-implemented method to detect the machine tool's degradation by characterizing a trend of change of a parameter in the cluster of machining processes performed by the machine tool in accordance with one embodiment. A cluster of the processes are obtained (61). The values of a parameter of the machine tool performing the cluster of the processes are obtained (62). The trend of the parameter is characterized through a unidirectional change of the parameter via a monotonicity test as described in $$\text{Monotonicity}(F) = \frac{\#d/dF > 0}{n-1} - \frac{\#d/dF > 0}{n-1} \qquad (4)$$

where F is the measurement of the parameter, n is the number of measurement in a period of time. F represents a parameter or feature and d/dF is the derivative (63). The maximum value of Monotonicity equals to 1 only if the feature is monotonically increasing. The value of monotonicity indicates the increasing trend of the spindle power, which indirectly indicates the degradation of the cutting tool. A threshold of the monotonicity value can be set up according to a set of factors, including the nature of the tools, the effect of tool failure on workflows, among others (64). When the threshold is exceeded, the machine tool may be red-flagged, and a notification may be generated or sent out (65).

A number of parameters from the cluster of machining processes performed by the machine tool can selected for the purpose of revealing the trend of change through the monotonicity test. In one embodiment, spindle power is selected.

Typically, the spindle power increase is proportional to the increased severity of tool wear for similar machining processes, because a blunted cutting tool compensate the degradation or decay of the cutting edge by increasing spindle power or speed. In a further embodiment, the machine tool's torque is selected. Typically, the machine tool's torque increase is proportional to the increased severity of tool wear for similar machining processes, because a blunted cutting edge requires a higher level of force to perform similar jobs compared to a non-bunted cutting edge. In a still further embodiment, heat generated by the machine tool during the machine tool processes is selected. Although heat generation is part of machining processes, increased heat generation for a similar machining process is often associated with the loss of the structural or functional integrity of the tool. In a yet further embodiment, the friction of a bearing associated with the machine tool during the machine tool process is selected. An increase of the friction level is often associated with the wear of the bearing. Other parameters are possible.

In a still yet further embodiment, multiple parameters can be selected for the analysis. If a degradation trend can be detected from the multiple processes belong to a same cutting tool, the predication confidence is increased compared to using one parameter.

Degradation Prediction

Figure 6:
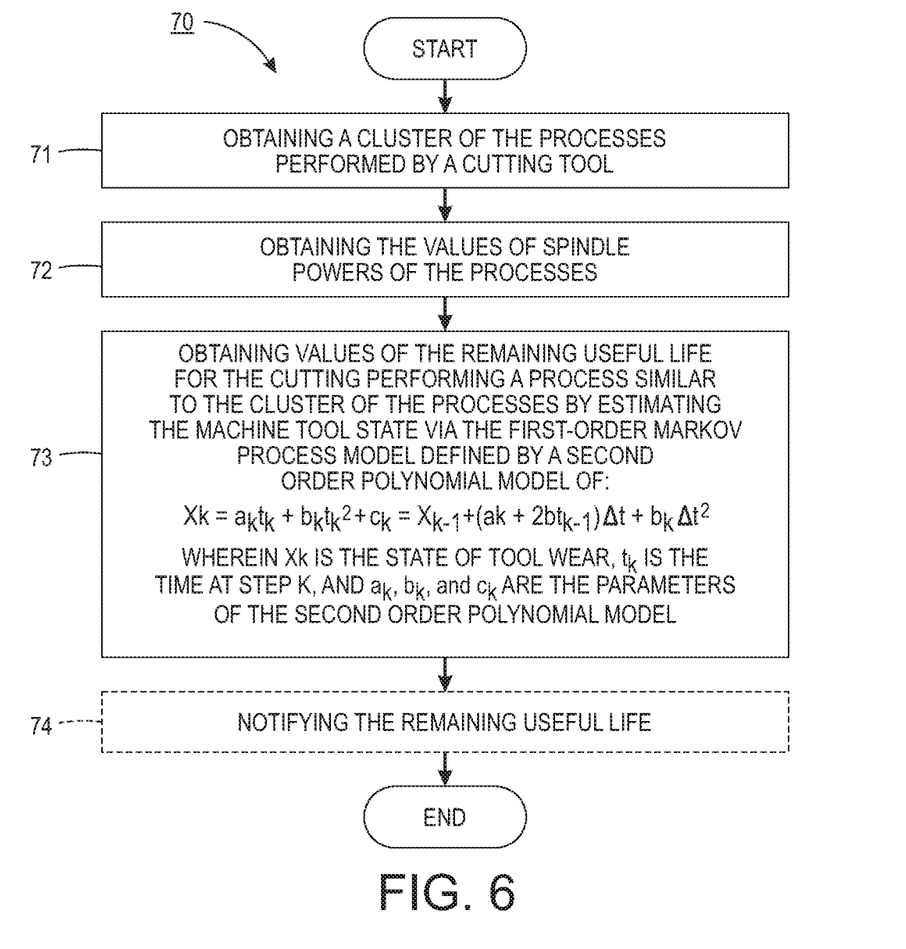
FIG. 6 is flow diagram showing a computer-implemented method for predicting a cutting tool's useful remaining life in accordance with one embodiment.

The degradation tread described supra can be extrapolated to infer the remaining useful life of the machine tool for the same or similar process. In one embodiment, a particle filter is adapted for the prediction. The prediction can be made using a continuous Bayesian update method assuming the fault growth following a physics-based system degradation model. In a further embodiment, a first-order Markov process is introduced into the particle filter prediction model. The first-order Markov process provides a more robust prediction when the current state was only dependent upon the last state. In a still further embodiment, the first-order Markov process is further defined into a second order polynomial model such as:

$$Xk = a_k t_k + b_k t_k^2 + c_k \quad (5)$$

where $X_k$ is the system state (tool wear in this case), $t_k$ is the time at step k, and $a_k$, $b_k$, $c_k$ are the parameters of the second order polynomial model. The Equation (5) can also be expressed as a Markov model as follows:

$$Xk = X_{k-1} + (a_k + 2b t_{k-1})\Delta t + b_k \Delta t^2 \quad (6)$$

The parameter identification and state estimation can be performed in parallel. The prediction method does not require system linearity. In a yet further embodiment, the machine tool is a cutting tool and the parameter used for prediction is the spindle power. FIG. 6 is flow diagram showing a computer-implemented method for predicting a cutting tool's useful remaining life. A cluster of the processes performed by a cutting tool is obtained (71); the values of spindle powers of the processes is obtained (72); the values of the remaining useful life of the cutting performing a similar process is predicted by estimating the machine tool state via the first-order Markov process model defined by a second order polynomial model of:

$$Xk = a_k t_k + b_k t_k^2 + c_k = X_{k-1} + (a_k + 2b t_{k-1})\Delta t + b_k \Delta t^2$$

wherein the Xk is the state of tool wear, $t_k$ is the time at step K, and $\alpha_k$, $b_k$, and $c_k$ are the parameters of the second order polynomial model (73); optionally, the information on the remaining useful life can be sent to a manufacturing shop floor (74).

Process Anomaly Detection Across Machines

Anomaly detection is an important aspect for a self-aware system. An anomaly is an exception or deviation from a typical pattern. An anomaly under the context of a manufacturing shop is an abnormal machine process, and may manifest through unusual, uncustomary exceptional, or extraordinary occurrence of the tool parameters, including a rare choice of a machine tool, unusually high or low spindle power in a machining process compare to similar machining processes, unusual high or low spindle speed in a machining process compare to similar machining processes, an uncharacteristic tool path in a machining process compare to similar machining processes, as well as other behaviors. In a manufacturing shop setting, parameters for the anomaly detection includes spindle speed, spindle power, feed rate, tool path (X-, Y-, and Z-positions in a 3-D space), time and duration, and tool ID. Other parameters are possible.

An anomaly under the context of a manufacturing shop does not necessarily imply a malfunction. The rare choice of the machine tool may be a deliberate switch of tools; the unusually high spindle speed or power may be a stochastic event from an external power surge; and the uncharacteristic tool path may be the result of a human intervention. These intended, and occasionally unintended deviations from the norms are normal and do not necessarily result from or cause machine malfunctions. These events may be labeled, annotated, accounted for, and excluded from further analysis.

On the other hand, an anomaly under the context of a manufacturing shop may well result from, and further cause a malfunction of a machine. The rare choice of the machine tool may be a mistake; the unusually high spindle speed or power may be a result of a damaged cutting edge, and is likely to further damage the cutting edge; and the uncharacteristic tool path may results from a wrong machine setting or unintended obstacle in the tool path, either of which will likely result in malfunction.

Thus, anomaly detection of the machining processes, when properly carried out, can reflect underlying problems of the machines and raise an early warning, contributing to the self-awareness of the machine. The anomaly detection may rely on the same sets of operational data used by the tool degradation assessment and prediction as described supra, but the thrusts of the analyses are different. The former focuses on counting outliers, whereas the latter focuses on evaluating trends. The anomaly detection does not require a specific model of failure, as a result is widely applicable and easily scalable. Finally, the accuracy and efficiency of early warning and objective advice in the manufacturing shop floor setting will be greatly improved by combining both the anomaly detection and the degradation assessment and prediction using the trend.

In one embodiment, a method for detecting an anomaly of a machine tool is provided. A stream of operational data comprising positional parameters and movement parameters of machining processes performed by the machine tool are collected. One or more outliers from the stream of the operational data are detected by a plurality of anomaly detection algorithms that are based on different failure models and assumptions. The number of the outliers present in the anomaly detection methods is determined. A threshold of the outliers based on the impact on workflow is selected and may adjusted. A notification can be sent when the number of the outliers exceeds the threshold.

In a further embodiment, a method for detecting an anomaly of a machine tool is provided. A stream of operational data comprising positional parameters and movement parameters of machining processes performed by the machine tool are collected. The distribution patterns of the operational data are characterized by multiple analytical methods. New operational data is collected and compared to the distribution patterns from the multiple analytical methods. The presence of one or more outliers against the distribution patterns of the analytical methods are determined. The number of the outliers are compared to a pre-determined threshold. Notice is sent when the number exceeds the threshold. The analytical methods includes self-organizing maps (SOMs), multivariate regression, and robust Mahalanobis distance, respectively.

Self-Organizing Maps (SOMs)

SOMs are a way to organize an incoming stream of data into a grid of cells where similar data tend to end up in the same or nearby cells. Typically, a Euclidean distance metric is used when assigning the data. As data accumulates, some cells may become very dense with the assigned data spots and is likely representative of a typical behavior or usage of a machine. Occasionally, a data instance, due to its unusual value, gets assigned to a sparsely populated cell, which indicates a deviation from the typical behavior or usage. These data instances may also be referred to as outliers. It is possible to label or annotate an outlier as a desirable, intended, or planned event, thus removing the outlier from the consideration or estimation of malfunction.

SOMs may be 2, 3 or high-dimensional depending the numbers of parameters or variables. Typically, one parameter correlates to one dimension. In one embodiment, spindle speed, spindle power, feed rate, X-, Y-, and Z-positions in a 3-D space, and tool ID are used for plotting 7-dimensional SOMs of tool processes of a machine tool.

Although the cells or grids start out with even size, they may be warped based on the distribution or density of the data points within the cells, to increase the resolution in spaces of high density where the majority of the data points reside. Furthermore, the Voronoi partition may be applied to the cells, so that each data point within a partition is assigned to the node associated with it.

Figure 7:
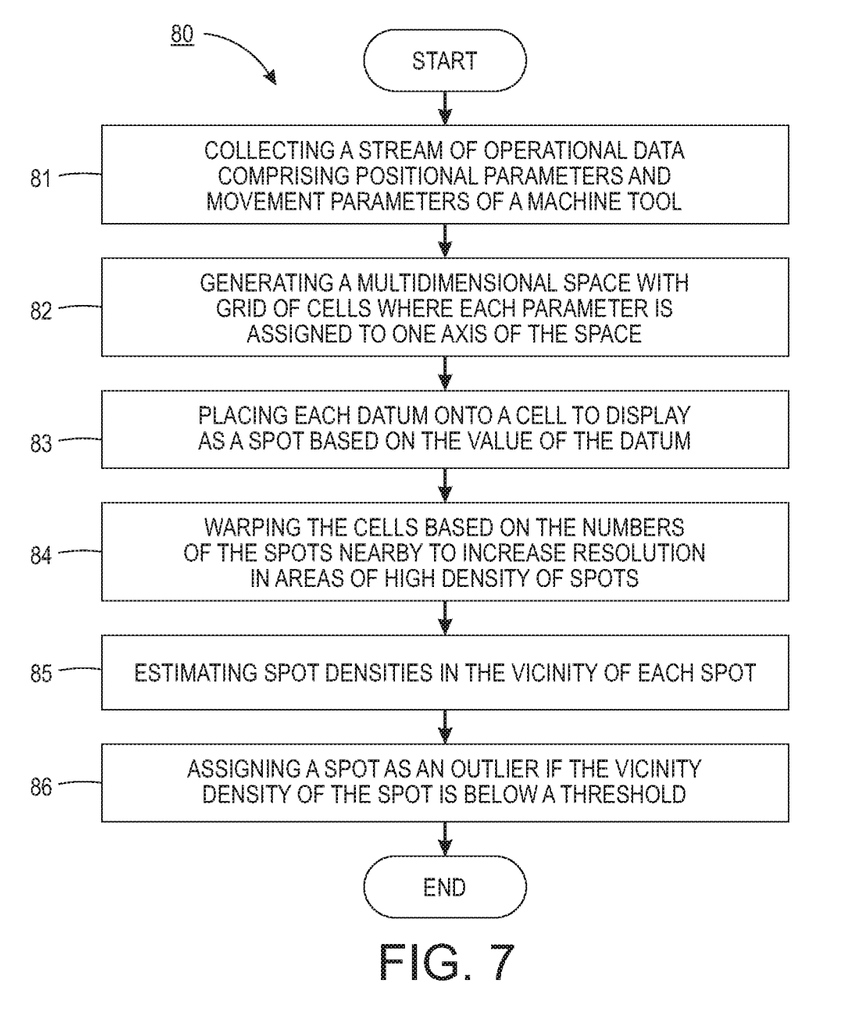
FIG. 7 is flow diagram showing a computer-implemented method for detecting one or more outliers from the stream of the operational data by a method of self-organizing maps in accordance with one embodiment.

In one embodiment, operational data of a machine, including spindle speed, spindle power, feed rate, tool path (X-, Y-, and Z-positions in a 3-D space), time, and tool ID, are used in SOM to detect outliers. FIG. 7 is flow diagram showing a computer-implemented method for detecting one or more outliers from the stream of the operational data by a method of self-organizing maps. A stream of operational data comprising positional parameters and movement parameters of a machine tool are collected (81). A multidimensional space with grid of cells was generated by assigning each parameter to one axis of the space (82). Each datum is placed onto a cell to display as a spot based on the value of the datum (83). The cells are warped based on the numbers of the spots nearby to increase resolution in areas of high density of spots (84). Spot densities in the vicinity of every spot are estimated (85). If a datum spot is located in an area where the spot density is lower than a threshold, the datum is assigned as an outlier (86).

Multivariate Regression

The operational parameters collected during a machining process are inter-connected. For example, in a controlled system such as a CNC machine, the high level requirements, such as a tool path, are translated into low level specifications, such as feed rate and spindle speed, which are then met by control inputs (e.g. spindle power). Thus correlations tend to exist between the parameters, such as a high power usage is correlated to a high spindle speed. These relationships between the different parameters can be ascertained to provide a warning when a new data instance exhibit a significant departure from the ascertain relationship.

The relationship between the parameters may be ascertained through a multivariate regression analysis. For the sake of convenience, each parameter, or its derivative, is a variable. Once the relationships among the parameters, or variables, are established, the value of a dependent variable can be estimated from the values of independent variables. Thus, a prediction interval may be obtained for a new data point.

In one embodiment, the parameters, or the variables, collected for the multivariate regression analysis includes spindle power, spindle speed, feed rate, tool ID, duration, and distance traveled by the tool. The tool ID is a categorical variable and the others are numerical variables. Instead of the entire tool path, intervals of the data collection process are sampled. Thus instead of analyzing an entire tool path, the distance traveled by the tool during a sampling instance are used. This combination provides sufficient resolution and predictive power without requiring unrealistically high computing power. Other combinations of parameters are possible.

In a further embodiment, a quantile regression forests analysis is used because we found this method provides an ideal fit to the scenario of manufacturing shop setting. Let $Q_\alpha$ be defined as $$Q_\alpha(x) = \inf\{P(Y \leq y | X = x) \geq \alpha\} \qquad (7)$$

Figure 8:
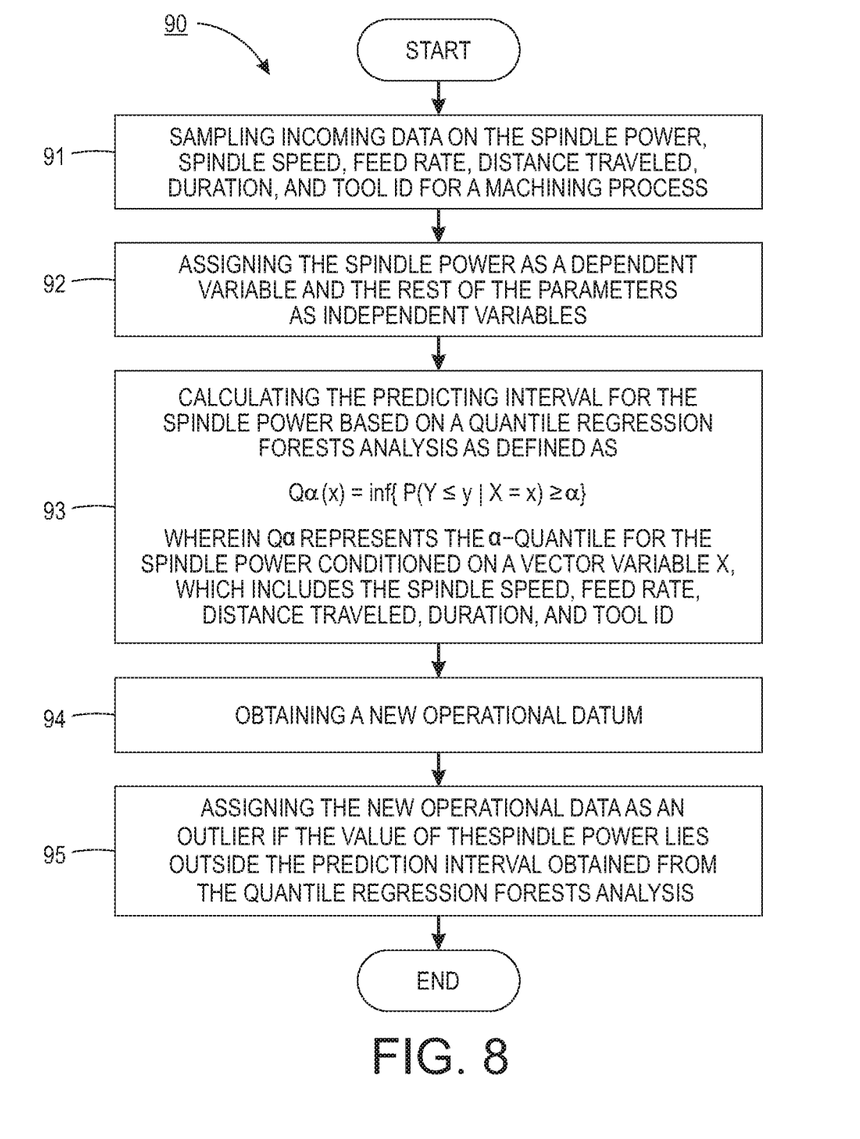
FIG. 8 is flow diagram showing a computer-implemented method for detecting one or more outliers from the stream of the operational data by a method of multivariate regression in accordance with one embodiment.

Then $Q_\alpha$ represents the $\alpha$-quantile for the conditional distribution of a variable Y conditioned on a vector variable X. If Y is the variable being predicted (independent variable) then $Q_\alpha$ defines its $\alpha$-quantile conditioned on the independent variable X In a still further embodiment, the independent variable Y, or predictive variable, is the spindle power; and the dependent variables X, or the prediction variables are the spindle speed, feed rate, tool ID, duration, and distance traveled by the machine tool. In a yet further embodiment, a prediction interval of [$Q_{0.025}$, $Q_{0.975}$] is used. A wilder range of prediction interval increases the accuracy but reduces the sensitivity of the detection method. FIG. 8 is flow diagram showing a computer-implemented method for detecting one or more outliers from the stream of the operational data by a method of multivariate regression in accordance with one embodiment. Incoming data on the spindle power, spindle speed, feed rate, distance traveled, duration, and tool ID for a machining process are sampled from a plurality of machining processes (91). The spindle power is assigned as a dependent variable and the rest of the parameters as independent variables (92). The predicting interval for the spindle power is calculated based on a quantile regression forests analysis as defined as:

$$Q_\alpha(x) = \inf\{P(Y \leq y | X = x) \geq \alpha\}$$

wherein $Q_\alpha$ represents the $\alpha$-quantile for the spindle power conditioned on a vector variable X, which includes the spindle speed, feed rate, distance traveled, duration, and tool ID (93). A new operational datum is obtained (94). The new operational data is assigned as an outlier if the value of the spindle power lies outside the prediction interval obtained from the quantile regression forests analysis (95).

An outlier refers to a data point that falls outside the prediction interval. A warning may be sent when a new data point falls outside the prediction interval. The occurrence of one or more outliers may also be combined with other analysis to provide a refined warning.

Robust Mahalanobis Distance

In the Mahalanobis distance analysis, outliers are data points that are samples from a different distribution rather than extreme values of the multivariate normal distribution. Thus a cutoff point is not needed for labeling a point as outlier. The Mahalanobis distance analysis requires samples from a multivariate normal distribution, a condition not satisfied when looking into the operational parameters. However, the normality distribution requirement can be satisfied by transforming the operational data into the principal component space and looking for the outliers in the space spanned by the top few principal components. Since principal components are aligned with directions of maximal variance, the outliers are easier to spot. Also, by looking in the reduced space of the top principal components, the signal to noise ratio is increased.

Figure 9:
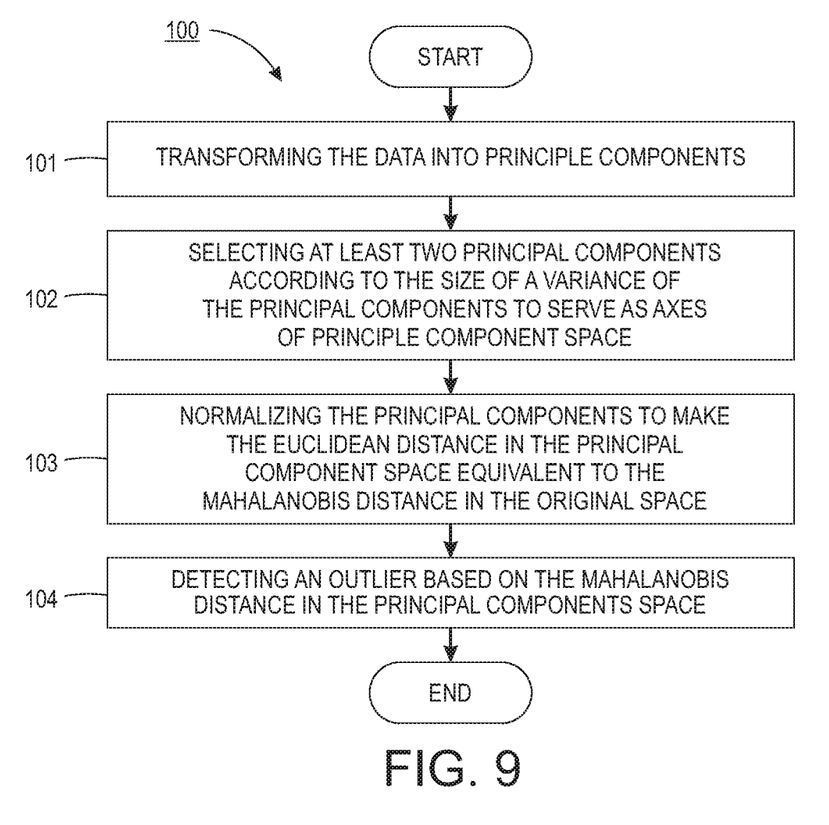
FIG. 9 is flow diagram showing a computer-implemented method for detecting one or more outliers from the stream of the operational data by a method of robust Mahalanobis distance in accordance with one embodiment.

In one embodiment, a normalization procedure is performed to make the Euclidean distance in the principal component space equivalent to the Mahalanobis distance in the original space by projecting the original feature space to the reduced space of the top principal components using a transformation matrix which converts the data to the directions of the top Eigen vectors. Outliers are measured based on its Mahalanobis distance in the absence of any distributional assumptions by checking whether the Euclidean distance is within a predefined threshold in the principal components space. FIG. 9 is flow diagram showing a computer-implemented method for detecting one or more outliers from the stream of the operational data by a method of robust Mahalanobis distance in accordance with one embodiment. Incoming data are transformed into their principle components (101). At least two principal components according to the size of a variance of the principal components are selected to serve as axes of principle component space (102). The values of the principal components are normalized to make the Euclidean distance in the principal component space equivalent to the Mahalanobis distance in the original space (103). Finally, an outlier is detected based on the Mahalanobis distance in the principal components space, when the Euclidean distance of the principle components of the incoming data exceeds a predefined threshold in the principal components space (104).

Ensemble of the Outlier Detection Methods

The three outlier detection approaches as described supra, e.g., self-organizing maps, multivariate regression, and robust Mahalanobis distance, make different assumptions and have different strengths and weaknesses. Therefore, combining them into an ensemble that can raise flags based on some predetermined policy can be more advantageous than using the approaches separately. For example, if the cost of a machine failure is very high, the ensemble may flag a data instance as an outlier if any member of the ensemble determines the data instance to be an outlier. Such a policy is termed an "OR Policy." Alternatively, if the cost of a needless disruption of workflow outweighs the cost of the machine failure, the ensemble may flag a data instance as an outlier only if all members of the ensemble agree. Such a policy is termed an "AND policy." In yet another scenario, the cost of a workflow disruption and the cost of a machine failure are in balance, a good policy might be for the ensemble to flag a data instance as an outlier if a large fraction of the ensemble members agree. Such a policy is termed a "MAJORITY policy." Finally, three outlier detection approaches, individually or in combination, may be combined with other outlier prediction method for warning purposes.

Shop Floor Planning Recommendation Through Comparing Usage and Performance Between Machines Another level of manufacturing shop floor planning involves comparing one machine's usage and performance to another. The information can be used to avoid damage due to unintentionally excessive usage by rescheduling the machining tasks.

Typically, a machine's bearing life, expressed in term of hours of operation, is adversely proportional to (load$^3$*rpm). Comparing the spindle lodes weighed by the time spent at the various spindle speeds may provide an estimate of relative spindle damage between two machines. In one embodiment, information on spindle usage, including spindle speed and load over time are used to estimate spindle damage. A histogram of the spindle loads weighted by the time spent at various spindle speeds is plotted and compared for two machines, which provides a relative estimate of remaining useful life of the spindle bearings. This information is fed back to a scheduling system depending on the shop's maintenance policy. For example, if all machines will be taken down around the same time for service, the machine with less spindle damage may be scheduled for more jobs until the spindle damages are balanced out prior to the service.

The aggregate axes traverse provides another measure of wear on various axes in a machine. In a further embodiment, information on aggregate axes traverse are used to provide an estimate of the way damage. The aggregate axes traverses are compared between two machines. If any axis travels beyond a threshold that is greater than twice of a comparable machine in the same time frame, part switching between the machines is recommended to balance. In addition, commanded position or the tool path of the machines are obtained. The aggregate axes traverses are compared to the commanded position or the tool path to discovery an error in position. Similar analysis can be employed to balance travel of various drive axes by shifting parts appropriately. These include rotating the fixtures based on current state and scheduled tool paths.

Warnings or recommendations based upon the usage and performance comparison between machines may be sent to manufacturing shop supervisors, operators, maintenance crews, or other related personnel. Measures can be subsequently taken to address the imbalance of the machine usage and wear in accordance to the objective estimate of machine wear and damage accumulation. As a result, manufacturing shop can move from a scheduled maintenance to a condition-based maintenance that more closely reflects the damage accumulation.

While the invention has been particularly shown and described as referenced to the embodiments thereof, those skilled in the art will understand that the foregoing and other changes in form and detail may be made therein without departing from the spirit and scope of the invention.

What is claimed is:

1. A system for detecting an anomaly of a machine tool, comprising:
   a server comprising a processor and configured to execute code, comprising:
   a collection module configured to collect a stream of operational data comprising positional parameters and movement parameters of machining processes performed by the machine tool;
   a detection module configured to detect one or more outliers from the stream of the operational data by a plurality of anomaly detection methods that are based on different failure models and assumptions;

a determination module configured to determine the number of the outliers present in the anomaly detection methods;

an adjustment module configured to adjust a threshold of the outliers based on cost of failure or impact on workflow; and a notification module configured to send a notification when the number of the outliers exceeds the threshold, wherein maintenance of the machine tool is performed based on the notification.

2. A system according to claim 1, further comprising:

an outlier module configured to detect one or more outliers from the stream of the operational data by a method of self-organization maps, comprising:

a space module configured to generate a multidimensional space with grid of cells where each parameter is assigned to one axis of the space;

a placement module configured to place each datum onto a cell to display as a spot based on the value of the datum;

a warping module configured to warp the cells based on the numbers of the spots nearby to increase resolution in areas of high density of spots;

an estimation module configured to estimate spot densities in the vicinity of each spot; and an assignment module configured to assign a spot as an outlier if the vicinity density of the spot is below a threshold.

3. A system according to claim 1, further comprising:

an outlier module configured to detect an outlier from the stream of the operational data by a method of multivariate regression, comprising:

a sampling module configured to sample a group of parameters collected during a plurality of machining processes;

a parameter module configured to assign one parameter from the group as a dependent variable and the rest of the parameters as independent variables;

a calculation module configured to calculate a predicting interval of the dependent variable based on a quantile regression forests analysis as defined as:

$$Q_\alpha(x) = \inf\{P(Y \leq y | X = x) \geq \alpha\}$$

wherein $Q_\alpha$ represents the $\alpha$-quantile for the conditional distribution of a variable Y conditioned on a vector variable X, wherein Y is the dependent variable and X is one of the independent variables;

a datum module configured to obtain a new operational datum; and an assignment module configured to assign the new operational datum as an outlier when a value of the dependent variable lies outside the prediction interval obtained from the quantile regression forests analysis.

4. A system according to claim 3, wherein the group of parameters comprises two or more of spindle power, spindle speed, feed rate, tool ID, duration, and distance traveled by the tool.

5. A system according to claim 3, wherein dependent variable comprises spindle power.

6. A system according to claim 1, further comprising:

an outlier module configured to detect an outlier of from the stream of the operational data by the method of robust Mahalanobis distance, comprising:

a transformation module configured to transform the data into principle components;

a selection module configured to select at least two principal components according to the size of a variance of the principal components to serve as axes of principle component space;

a normalization module configured to normalize the principal components to make the Euclidean distance in the principal component space equivalent to the Mahalanobis distance in the original space; and an assignment module configured to assign an operational datum as an outlier when the Euclidean distance of the datum is outside a predefined threshold in the principal components.

7. A system according to claim 1, further comprising at least one of:

a recommendation module configured to provide a recommendation on scheduling the machine tool maintenance by comparing a performance history of the machine to another machine performing comparable machining process, comprising:

a histogram module configured to compare a histogram of a spindle speed measured by RPM weighted by spindle load at the speed for the one machine to the other; and a comparison module configured to compare the total traverse of across all feed axes on the one machine to the other.

8. A system according to claim 1, wherein the one or more outliers are detected upon at least one of the anomaly detection methods identifying the presence of the one or more outliers.

9. A system according to claim 1, wherein the one or more outliers are detected upon all of the anomaly detection methods identifying the presence of the one or more outliers.

10. A system according to claim 1, wherein the one or more outliers are detected upon a majority of the anomaly detection methods identifying the presence of the one or more outliers.

11. A method for detecting an anomaly of a machine tool, comprising:

collecting a stream of operational data comprising positional parameters and movement parameters of machining processes performed by the machine tool;

detecting one or more outliers from the stream of the operational data by a plurality of anomaly detection methods that are based on different failure models and assumptions;

determine the number of the outliers present in the anomaly detection methods;

adjusting a threshold of the outliers based on cost of failure or impact on workflow; and sending a notification when the number of the outliers exceeds the threshold, wherein maintenance of the machine tool is performed based on the notification.

12. A method according to claim 11, further comprising:

detecting one or more outliers from the stream of the operational data by a method of self-organization maps, comprising:

generating a multidimensional space with grid of cells where each parameter is assigned to one axis of the space;

placing each datum onto a cell to display as a spot based on the value of the datum;

warping the cells based on the numbers of the spots nearby to increase resolution in areas of high density of spots;

estimating spot densities in the vicinity of each spot; and assigning a spot as an outlier if the vicinity density of the spot is below a threshold.

13. A method according to claim 11, further comprising:
detecting an outlier from the stream of the operational data by a method of multivariate regression, comprising:
sampling a group of parameters collected during a plurality of machining processes;
assigning one parameter from the group as a dependent variable and the rest of the parameters as independent variables;
calculating a predicting interval of the dependent variable based on a quantile regression forests analysis as defined as:

$$Q_\alpha(x)=\inf\{P(Y\leq y|X=x)\geq\alpha\}$$

wherein $Q_\alpha$ represents the $\alpha$-quantile for the conditional distribution of a variable Y conditioned on a vector variable X, wherein Y is the dependent variable and X is one of the independent variables;
obtaining a new operational datum; and
assigning the new operational datum as an outlier when a value of the dependent variable lies outside the prediction interval obtained from the quantile regression forests analysis.

14. A method according to claim 13, wherein the group of parameters comprises two or more of spindle power, spindle speed, feed rate, tool ID, duration, and distance traveled by the tool.

15. A method according to claim 13, wherein dependent variable comprises spindle power.

16. A method according to claim 11, further comprising:
detecting an outlier of from the stream of the operational data by the method of robust Mahalanobis distance, comprising:
transforming the data into principle components;
selecting at least two principal components according to the size of a variance of the principal components to serve as axes of principle component space;
normalizing the principal components to make the Euclidean distance in the principal component space equivalent to the Mahalanobis distance in the original space; and
assigning an operational datum as an outlier when the Euclidean distance of the datum is outside a predefined threshold in the principal components.

17. A method according to claim 11, further comprising at least one of:
providing a recommendation on scheduling the machine tool maintenance by comparing a performance history of the machine to another machine performing comparable machining process, comprising:
comparing a histogram of a spindle speed measured by RPM weighted by spindle load at the speed for the one machine to the other; and
comparing the total traverse of across all feed axes on the one machine to the other.

18. A method according to claim 11, wherein the one or more outliers are detected upon at least one of the anomaly detection methods identifying the presence of the one or more outliers.

19. A method according to claim 11, wherein the one or more outliers are detected upon all of the anomaly detection methods identifying the presence of the one or more outliers.

20. A method according to claim 11, wherein the one or more outliers are detected upon a majority of the anomaly detection methods identifying the presence of the one or more outliers.

* * * * *